Nov. 1, 1927.

E. WILDHABER

METHOD OF PRODUCING GEARS

Filed May 11, 1925

Inventor
Ernest Wildhaber

By B. E. Shlesinger
his Attorney

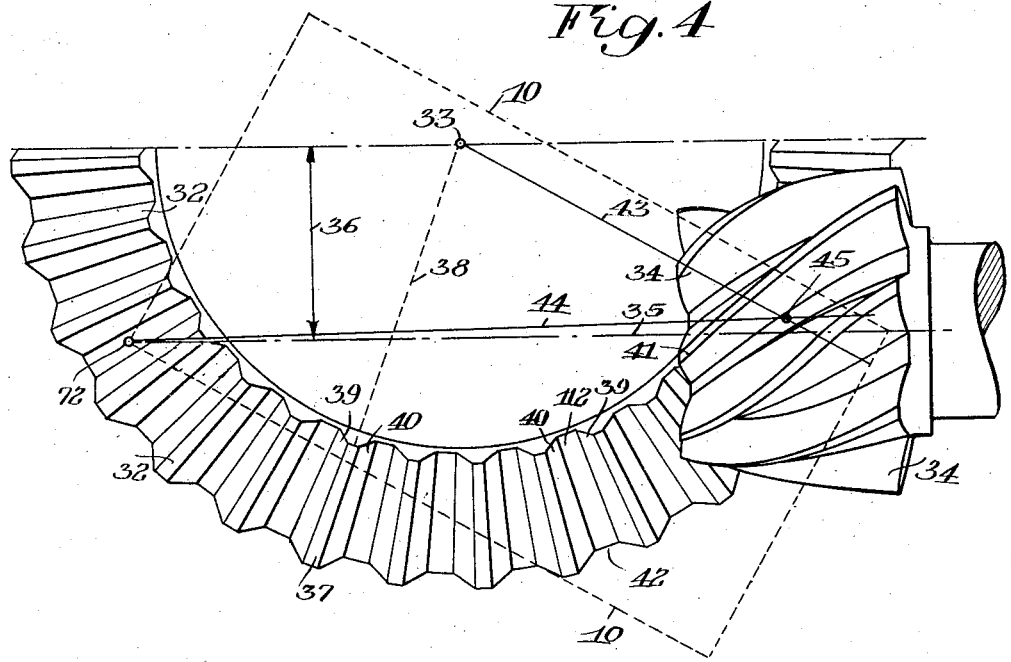
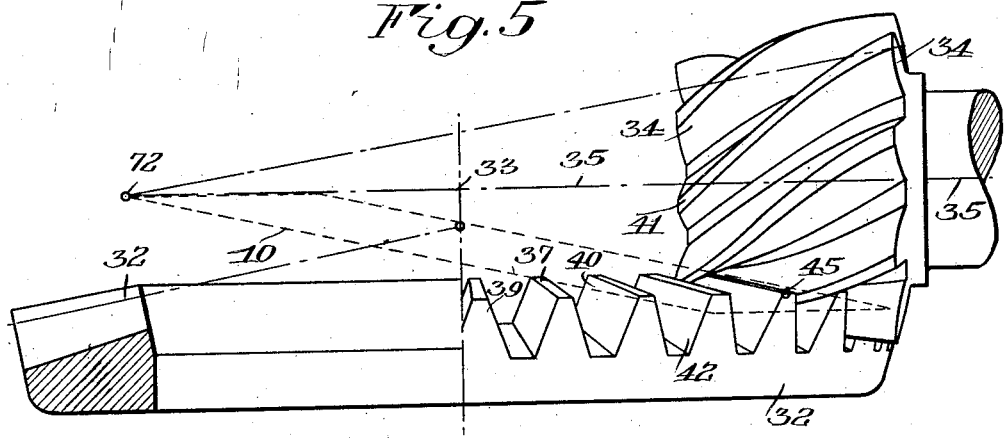

Nov. 1, 1927. 1,647,165
E. WILDHABER
METHOD OF PRODUCING GEARS
Filed May 11, 1925 4 Sheets-Sheet 3

Inventor
Ernest Wildhaber
By
his Attorney

Nov. 1, 1927. 1,647,165
E. WILDHABER
METHOD OF PRODUCING GEARS
Filed May 11, 1925 4 Sheets-Sheet 4

Inventor
Ernest Wildhaber
By
his Attorney

Patented Nov. 1, 1927.

1,647,165

UNITED STATES PATENT OFFICE.

ERNEST WILDHABER, OF ROCHESTER, NEW YORK, ASSIGNOR TO GLEASON WORKS, OF ROCHESTER, NEW YORK, A CORPORATION OF NEW YORK.

METHOD OF PRODUCING GEARS.

Application filed May 11, 1925. Serial No. 29,553.

The present invention relates to gears and to a method for producing the same. In particular this invention relates to gears which operate with axes non-intersecting and non-parallel.

One object of the present invention is to provide a pair of gears having axes non-intersecting and non-parallel which shall have improved efficiency and improved tooth contact.

A further object is to provide gears of this type with teeth of such shape that they may be accurately finished and readily ground.

Other objects are to provide a pair of gears with axes non-intersecting and non-parallel which is capable of accurate and rapid manufacture, which will be quiet in operation, which will wear evenly and which will have a high ratio of efficiency.

Other objects will appear in the course of the specification and from the appended claims.

With the above and other objects in view, my invention resides in the various novel features peculiar to the new type of gears and in the novel steps constituting the new process, which are illustrated in the accompanying drawings, described in the specification and set forth in the claims appended hereto.

In the drawings:

Figure 4 is a plan view of a pair of gears constructed according to my invention.

Figure 5 is a side elevational view, partly in section of the pair of gears shown in Figure 4.

Figure 1:
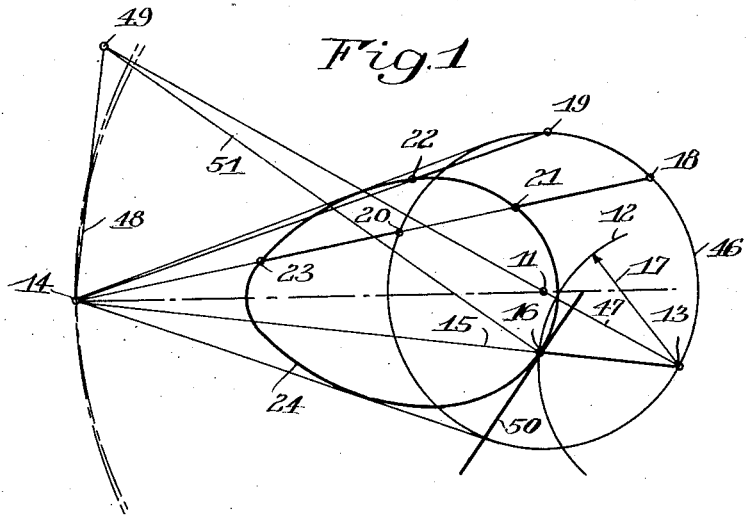
Figures 1 and 2 are diagrammatic views, illustrative of the theory upon which the determination of the proportions of the new gears is based.

Gears with non-intersecting axes in which one or both members is or are cut from a conical or crown blank are known as hyperboloidal or hypoid gears. These gears have a zone of action which is outside the shortest connecting line between their axes. While gears of this type, as heretofore produced, have had the advantage that the axes of the driving and driven member might be offset one from the other, to permit of drives not possible with bevel gears, this advantage has been offset by the noise of operation, the general weakness of one member of the pair and the difficulty of production which characterized such gears as heretofore produced.

The present invention aims to overcome the difficulties heretofore encountered in the design and production of hypoid gears as well as to provide a superior tooth form. According to this invention, gears of such proportions are provided, that the teeth have a gradual mesh and contact along the entire tooth surface, while permitting endwise sliding of the teeth and that the teeth of the pinion will match substantially the tooth spaces of the gear along their entire length. Such gears necessarily have teeth of maximum strength, the teeth being as thick along the whole tooth space, as the mating tooth space is wide. This construction insures long wear also, as a maximum active tooth surface is obtained and the mesh extends along the whole length of the teeth. The gears of this invention are quiet in operation, the tooth surfaces sliding on one another while in mesh which feature also has the effect of preserving the desired tooth shape of the gears throughout their life.

The present invention has for its object particularly the production of pairs of gears, in which the pinion or smaller member is provided with teeth whose inclination or spiral angle is greater than that of the teeth of the gear. In gears of this type, the diameter or strength of the pinion is increased as compared with a bevel pinion, which meshes with a gear of the same diameter and at the same ratio.

Gears formed according to this invention can be easily produced and both members may be readily ground if desired. They have the advantage of increased efficiency over worm gears and reduction in thrusts.

The process followed in determining how to construct hypoid gears so that their teeth have a gradual mesh and contact along their entire length will now be disclosed.

It was realized that the desired mesh could be obtained if the gears were so proportioned that their mesh extended in the general direction of the pinion axis and that this would be the case when the projection of the pinion axis into a plane tangent to the pitch surfaces of both gears was tangent to a line of action between the gears at a mean contact point. The first step, then, was to determine how to locate the line of action between a pair of hypoid gears. The next step was to determine how a tangent to the line of action might be located without first determining the line of action. Having achieved this, my final step was to assume the projected pinion axis tangent to the line of action and from this determine the proportions of the gears necessary to secure the desired mesh.

Figure 2:
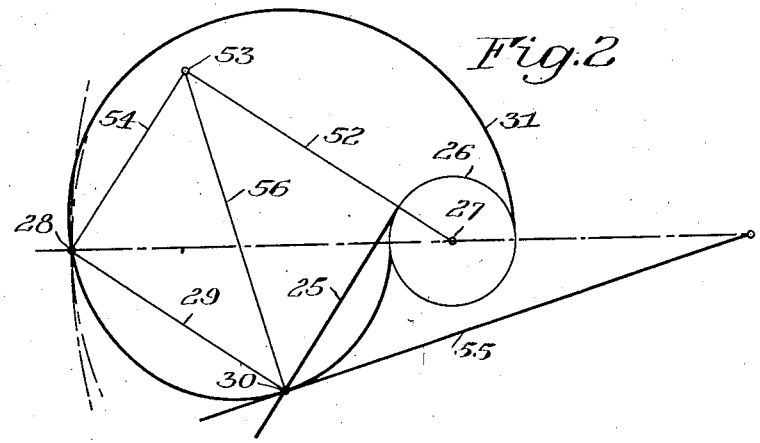
Figure 3:
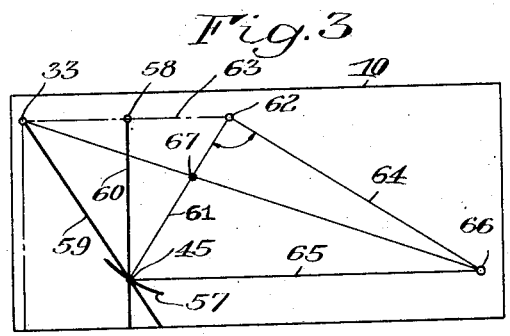
Figure 3 is a diagrammatic view showing the development of a pair of gears, constructed according to this invention, in a plane tangent to their respective pitch surfaces at a common point of contact.

Figures 1, 2 and 3 illustrate diagrammatically the method of determining the line of action, the method of determining the location of a tangent to the line of action without first determining the line of action, and the method of determining the proportions of the gear pair given the projected pinion axis tangent to the line of action. Referring to Figures 1 and 2, the plane of the paper represents a plane tangent to the pitch surfaces of a pair of hypoid gears. This plane is shown in Figure 4 in dotted lines, where it is indicated by the numeral 10.

In development, pitch lines necessarily mesh like ordinary tooth profiles and are subject to the known requirements of tooth profiles. In the plane of Figure 1 we can assume the point 11 as the center or apex of one of the developed gears. We can also assume a longitudinal profile or longitudinal tooth curvature for the gear. For a straight tooth gear the center of this profile will be at infinity. To assist in the solution of my problem, I have preferred to choose a longitudinal tooth profile having a center at a finite distance, and for convenience I have selected as the longitudinal tooth curvature or profile of the gear a circular arc 12 having its center at 13. We can now determine the line of action between a gear having its apex at 11 and a mate gear, having a longitudinal tooth curve or profile which will mate with the longitudinal tooth curve or profile 12 and which is so turned in timed relation with the first gear that the rolling circles or pitch circles of the two bodies, containing the said two profiles, contact in a point 14. It is not necessary to illustrate this mate gear or its profiles as the data which we require can be readily determined from the choice of the point of contact of the pitch circles. This point 14 which may be called the pitch point is the only point required with respect to the mate profile, for determining the line of action. By selecting the pitch point outside the tooth profile a general solution may be obtained. It will be understood, however, that the pitch point may be chosen if desired on the tooth profile without affecting my problem or its solution.

As is well known a point of contact between mate profiles is located by drawing from the pitch point 14 a perpendicular 15 to the profile 12. The intersection point between the perpendicular 15 and the profile 12 is a point of contact between the mate profiles and hence a point of the line of action. In the present case the perpendicular 15 is the connecting line between the pitch point 14 and the center 13 of the profile 12.

The contact point 16 is determined by plotting the radius 17 of the profile 12 on the perpendicular 15. When this determination is repeated for the various positions 18, 19, 20 of the profile center 13, during the rotation of the mating gears, other points 21, 22, 23 of the line of action may be located. The line of action is found to be an oval curve 24.

In Figure 1 the radius 17 has been plotted inwardly of the profile center 13. It might, without affecting our solution, have been plotted outwardly on the perpendicular 15.

Figure 2 is a diagram corresponding to Figure 1 in which the line of action has been determined for a pair of hypoid gears one of which has straight teeth, to which, in particular, the present application has reference. In Figure 2 the profile is taken at 25. Its center will be at infinity. As illustrated the profile 25 is tangent to a circle 26 whose center is at 27, the center or apex of the gear. 28 is the pitch point corresponding to the point 14 of Figure 1. The line of action is again determined by drawing perpendiculars 29 through the pitch point 28 and locating the intersection points 30. The line of action is found to be a curve 31 which approaches the form of a circular arc. It would be accurately a circular arc if a profile 25 passed through the center 27 of the gear, that is if the teeth of the gear were radial.

As before stated, the distinguishing feature of my invention is the proportioning of the mating gears so that they have contact along the entire tooth surface of one member of the pair. Referring now to Figures 4 and 5, it will be seen that in order to have the mesh extend along the entire tooth space of one member of the pair, the line of action should extend in the general direction of the pinion axis. In these figures, wherein I have illustrated one embodiment of my invention, a pair of gears is shown, consisting of a gear 32 rotatable about an axis 33 and of a pinion 34, which turns on an axis 35. The axes 33 and 35 are non-intersecting and angularly disposed, the shown angle between the axes being a right angle. The shortest distance 36 between the two axes, or the amount of offset of the two gears, will be smaller than the outside diameter of the larger gear of the pair.

The gear 32 is provided with teeth 37 which extend along radii 38. The sides 39 and 40 of the teeth are flat surfaces or planes. The teeth of the gear, therefore, are of constant profile. The teeth 41 of the pinion 34 are so constructed as to match the tooth spaces 42 of the gear.

As already stated, it can readily be shown and it is apparent from Figures 4 and 5 that if the mesh between the two gears is made to extend in the general direction of the pinion axis the line of action will be along the entire tooth surface of one member of the pair. The line of action should, therefore, extend along the axis of the pinion projected into a plane tangent to the pitch surfaces of gear and pinion. The gears will mesh along a line of action which extends substantially along the projected pinion axis, when the projected pinion axis is a tangent to the line of action in a mean point.

In order, therefore, to determine the proportions necessary for the two mating gears to secure the desired mesh, we shall consider their mesh in a plane 10 tangent to their pitch surfaces. In this plane the projected axis of the gear is indicated at 43 and the projected axis of the pinion at 44. The projected axes intersect in this plane at the mean or common contact point 45.

Referring now to Figure 1, we can determine tangents to the line of action 24 without first determining the latter. It will be noted that in this figure the line of action 24 can be considered the path of a point 16 on a straight line 15 whose one end 13 moves on a circle 46 and whose other end 14 slides on the point 14. The instantaneous axis of motion of the straight line 15 is therefore on a radius 47 which passes through the center 13 of the profile 12 and the center 11 of the gear, and on a perpendicular 48 to the line 15 at the point 14. In other words an infinitesimal portion of the motion of the straight line 15 equals a small turning motion about the point 49 which is the intersection point of the lines 47 and 48. In this motion every point of the line 15 travels perpendicularly to the radius between said point and said point 49. Hence it follows that the tangent 50 to the line of action 24 at the point 16 is perpendicular to the line 51 drawn radially from the instantaneous axis 49 to said point 16. The tangent 50 may therefore be located as follows: The radius 47 is intersected with a perpendicular 48 to the straight line 15 at 14. The tangent 50 is drawn through the point 16 at right angles to the line 51 connecting the points 49 and 16. This enables us to determine the location of the tangent to a line of action without first determining that line of action. The next step in the solution of our problem requires the selection of the projected pinion axis in the plane 10 as a tangent to the line of action. This step will be considered hereinafter.

As already noted, the solution obtained from Fig. 1 is based on the choice of a profile 12 which, for the sake of convenience, has a center at a finite distance. That the data obtained from Figure 1 is equally applicable, however, to profiles 25 which are straight is clear from a consideration of the diagram of Figure 2.

In Figure 2, as already stated, the profile 25 has a center at infinity. The connecting line 52 between the center 27 of the gear and the center of the profile 25 is therefore perpendicular to the line 25. Hence the point 53 which corresponds to the point 49 of Figure 1 is found by drawing line 52 perpendicular to profile 25 and intersecting it with a perpendicular 54 to the perpendicular 29 at the pitch point 28. The tangent 55 at the point 30 is at right angles to the line 56 connecting the points 53 and 30.

To secure a line of action which will extend along the axis of the pinion projected into the plane 10, that is a line of action to which the projected pinion axis is tangent, the cone angles, tooth numbers and the offset of the axes of gear and pinion must have determinate and related proportions. These proportions we must now determine. Referring to Figure 3, wherein the pitch surfaces of the mating gears have been developed into the plane 10. We can either assume the radius of the teeth of the gear or the distance of the pinion apex from the mean contact point 45, or another equivalent quantity, in addition to the tooth inclination.

For the purpose of our solution the pitch line 57 has again been constructed so as to have a finite center. In Figure 3, 33 is the center or apex of the gear and 59 and 60 are the projections into the plane 10 of the gear and pinion axes respectively. If now we desire to determine the position of the profile center or the radius of the teeth of the gear, we can assume the pinion apex at 58 and that 61 is the tooth normal at the point 45, that is a line which is perpendicular to the pitch line 57 of the gear.

The intersection point 62 between the line 63 connecting the gear and pinion apexes, 33 and 58 respectively, and the tooth normal 61 is the pitch point of the pair in development. This point corresponds to the point 14 in Figure 1. A perpendicular 64 is erected at 62, perpendicular to the tooth normal 61. The perpendicular 64 intersects the line 65 drawn through the point 45 perpendicular to the projected pinion axis 60, at the point 66. This point 66 corresponds to the point 49 of Figure 1. The connecting line between this point 66 and the gear center or apex 33 intersects the tooth normal 61 at the center 67 of the longitudinal tooth profile 57 of the gear. From the above, it can be determined where the center of the longitudinal tooth profile is located.

By assuming the location of the center of the longitudinal tooth profile 67, we can determine from the data of Figure 3, if desired, the location of the pinion apex 58.

Any further data with respect to the offset of the gear and pinion axes can be determined mathematically or graphically from Figure 3.

To determine the cone angles of the pair, let $a'$ be the cone angle of the gear and $a''$ be the cone angle of the pinion, $N'$ and $N''$ be the tooth numbers of gear and pinion respectively. In development the pitch surface of a gear will not occupy a full circumference. The tooth number of the full circumference, in development, bears the same relation to the actual tooth number $N'$ or $N''$, as the tooth number of a crown gear is to the tooth number of a bevel gear. Hence the tooth numbers of the full circumference, in development, of gear and pinion, respectively, are:

$$\frac{N'}{\sin a'}$$

and $$\frac{N''}{\sin a''}.$$

The ratio of gear and pinion tooth numbers in development equals the ratio of the distances of the respective centers 33 and 58 from the pitch point 62. This known ratio is called A. Hence:

$$\frac{N'}{\sin a'} : \frac{N''}{\sin a''} = A$$

or $$\frac{N'}{N''} \cdot \frac{\sin a''}{\sin a'} = A.$$

A further requirement is, that the axis of the pair, which are projected into lines 59 and 60, respectively, are at a given angle to each other, which is preferably a right angle. The arrangement of the gears with axes at right angles can be expressed by the formula:

$$\tan a' \times \tan a'' = \cos b. \quad (2)$$

where $b$ is the angle included between the projected axes 59 and 60.

These two equations furnish the following solution:

$$\sin^2 a'' = \sqrt{\frac{C_1^2}{4} + C_2} - \frac{C_1}{2} \quad (3)$$

where:

$$C_1 = \cotan^2 b \times \left[ \left(\frac{N''}{N'}\right)^2 A^2 + 1 \right]$$

$$C_2 = \cotan^2 b \times \left[ \left(\frac{N''}{N'}\right)^2 A^2 \right]$$

The cone angles $a''$ and $a'$ may therefore be determined from either Equation (1) or (2).

From the plane of Figure 3 and from the above formulas the data for a pair of gears may be determined in such manner that the mesh between the same extends along the whole length of the gear teeth. This mesh will extend also over the whole or a large portion of the length of the pinion teeth. The gears moreover will be capable of sliding while in mesh, as required, and the teeth of one will match the tooth spaces of the other.

Figure 6:
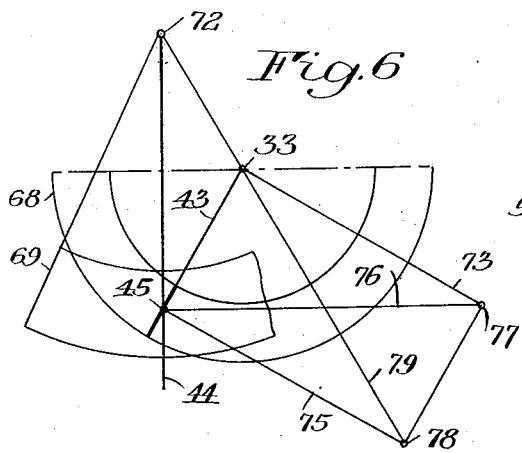
Figures 6 and 7 are diagrammatic views, similar to Figure 3, showing the developed pitch surfaces of gears constructed according to two different embodiments of my invention. These views are taken in a plane corresponding to the plane of Figure 3.
Figure 7:
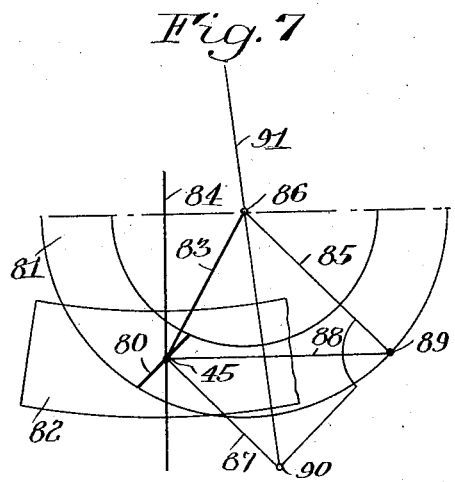

Figures 6 and 7 show diagrammatically two embodiments of my invention in which the necessary data has been determined directly for gears having straight teeth or teeth whose longitudinal profile centers are at infinity. Figure 6 shows diagrammatically a pair such as illustrated in Figures 4 and 5. Figure 7 shows the development of a pair in which the teeth are non-radial or skew.

Referring to Figure 6, 68 and 69 are respectively parts of the developed pitch cones of the gears 32 and 34, respectively. The projected axes are indicated at 43 and 44. In order to locate the apex 72 of the pinion the line 73 is drawn through the gear apex 33 parallel to the normal 75. This line intersects line 76, which is drawn perpendicular to the projected pinion axis at the common contact point 45, in a point 77. The projection of this point 77 onto the normal 75 furnishes the pitch point 78. The apex of the pinion is located at the intersection of the line 79 drawn from the pitch point 78 and passing through the gear apex 33, with the projected pinion axis.

In Figure 7, the gear is provided with teeth 80 which are non-radial or skew. 81 and 82 are parts of the developed pitch surfaces of gear and pinion respectively. 83 and 84 represent the projected axes. Line 85 drawn through the gear apex 86 parallel to the tooth normal 87 intersects line 88 drawn perpendicular to the projected pinion axis 84 at the common contact point 45, in the point 89. The projection of this point 89 onto the tooth normal 87 is the pitch point 90. The apex of the pinion may be located by drawing a line 91 from the pitch point 90 through the gear apex 86 to the intersection of this line 91 with the projected pinion axis 84.

Figure 8:
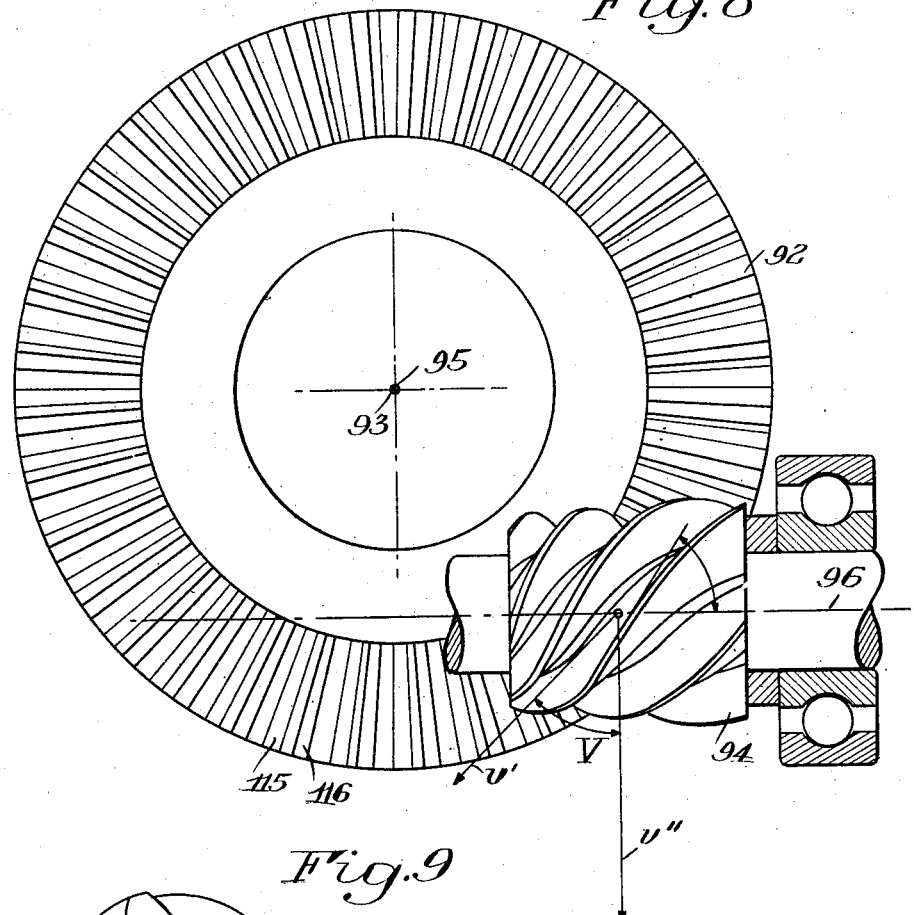
Figure 8 is a plan view of a pair of gears constructed according to an embodiment of my invention different from that of Figure 4.
Figure 9:
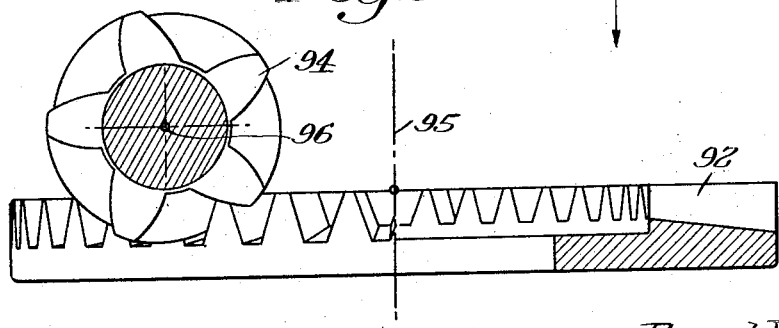
Figure 9 is an end elevation, partly in section, of the pair shown in Figure 8.

Figures 8 and 9 illustrate a further embodiment of my invention in which the gear is a crown gear 92, having its pitch surface in a plane and having plane tooth sides 115 and 116 of constant profile extending radially of its center or apex 93. The pinion is constructed so as to be conjugate to the gear. This pinion 94 is a cylindrical worm. The axes of gear and pinion are at 95 and 96, respectively. This particular type of gear has a much better efficiency than worm gears. The peripheral velocities of the two members, in the zone of contact, are at acute angles to one another, the angle V constituted by the peripheral velocities $v'$ and $v''$ being an acute angle. In worm drives this angle would be a right angle. These gears have the additional advantages of the new type of hypoid gears, in that the tooth contact is superior and more intimate and in that the lines of action are more inclined to the direction of sliding. Both these factors are assets of strength, long wear, and perfect lubrication.

Figure 10:
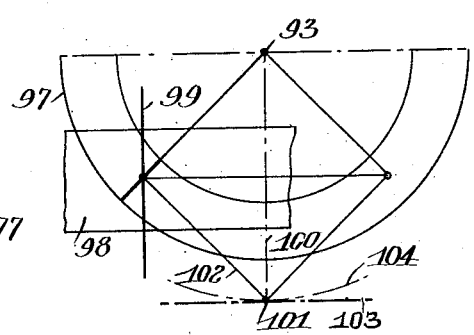
Figure 10 is a diagrammatic view, similar to Figure 3, and showing the development of the pair shown in Figures 8 and 9.

Figure 10 illustrates diagrammatically the mesh of the gears shown in Figures 8 and 9. This figure, like Figures 3, 6 and 7 is a development in a plane tangent to the pitch surfaces of the two gears at a common contact point. In this figure 97 and 98 are parts of the developed pitch surfaces of gear and pinion respectively. 93 is the axis of the gear 99 the projected pinion axis. As has been determined above the line 100 connecting the pitch point 101 with the center 93 of the gear intersects the projected pinion axis 99 in its apex. When the pinion is cylindrical the line 100 will intersect the line 99 at infinity, that is the line 100 will be parallel to the line 99. The pitch point 101 is located, in a manner similar to that described for the embodiments of Figures 6 and 7, by intersecting the tooth normal 102 with the line 100.

It should be noted with respect to the gears just described, that their developed pitch surfaces mesh like rack and gear having a pitch line 103 and a pitch circle 104, respectively which contact at the pitch point 101. The circular pitch of the pinion equals the circular pitch of the gear at circle 104.

The gears which form the subject of this invention may be produced in any convenient manner. Preferably the gear or larger member of the pair is produced by causing a cutting edge to sweep across the face of the gear in such manner as to provide teeth of constant profile. The gear blank will be held stationary and the tool moved in the desired direction with reference to the gear apex. This direction will be radial in the case of the gear 32 or 92, and non-radial in the case of the gear illustrated diagrammatically at 81 in Figure 7. The tooth surfaces of the pinion will preferably be formed by moving a cutting edge, representing a tooth of the gear, through the pinion blank, that is across the face thereof, while imparting a relative rolling motion between the tool and blank in the manner of a pinion rolling with its mate gear with its axis offset from the axis of the gear.

Figure 11:
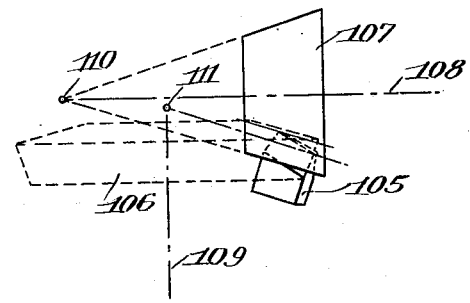
Figure 11 is a view showing diagrammatically the method by which a pinion may be produced according to this invention.

The method for producing the pinion is illustrated diagrammatically in Figure 11 where 105 represents a tool having an effective cutting portion representing the gear, shown in broken lines at 106 and where the pinion 107 is rotated about its axis 108 and simultaneously moved, relatively to the tool, about the axis 109 of the gear while its axis 108 is maintained offset from the axis 109 of the gear. The amount of offset is determined by the method already described. The apex of the pinion blank is at 110, while the apex of the imaginary mate gear with which the pinion is theoretically in mesh during generation is at 111.

If desired the tooth spaces of the gear may be provided with bottoms, indicated at 112 in Figure 4, which are of constant width, so that both sides 39 and 40 of a tooth space may be cut simultaneously without resorting to special machinery.

By the method described, it will be seen that the gear or larger member of the pair is non-generated and that the pinion is produced by a molding-generating process in which the pinion blank is rolled on the gear while its axis is maintained in proper offset relation to the gear axis.

Figure 12:
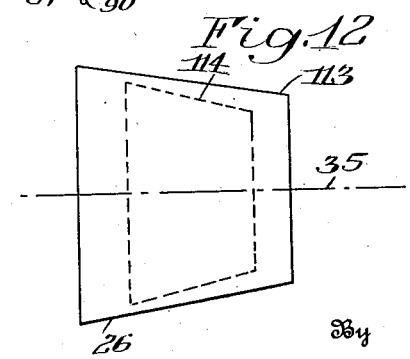
Figure 12 is a diagrammatic view showing by way of comparison a bevel pinion of the known type and a pinion produced according to this invention.

One feature of a pair produced according to my invention is the added strength of the pinion, for the same ratio, over the usual bevel pinion. This increase in strength is illustrated diagrammatically in Figure 12, where 113 is the outline of a pinion produced according to the present invention and 114 the outline of a corresponding bevel pinion. The diameter of the pinion may be made the larger, the more its teeth are inclined to the generatrices of its pitch surface.

While I have illustrated certain preferred embodiments of my invention, it will be understood that this invention is capable of further modification within the limits of the disclosure and the scope of the appended claims. This application is intended to cover any variations, uses, or adaptations of my invention, following, in general, the principles of the invention and including such departures from the present disclosure as come within known or customary practice in gear cutting and may be applied to the essential features hereinbefore set forth and as fall within the limits of the appended claims.

Having thus described my invention, what I claim is:

1. The method of producing gears with axes non-intersecting and non-parallel which consists in forming one of the gears by the movement of a cutting edge across the face of the gear blank while maintaining said edge in contact with the finished tooth surface of the gear and producing the other gear by imparting a cutting movement to a tool representing a tooth of the first gear, while producing a relative movement between tool and blank as of a gear rolling with the first gear and having its axis offset from the axis of the first gear and proportioning the two gears so as to secure contact therebetween along the entire tooth surface of one gear.

2. The method of producing a gear adapted to form one of a pair of gears having axes non-intersecting and non-parallel which consists in relatively moving a gear blank and a tool representing a tooth of the mating gear to provide the desired lengthwise tooth profile and in imparting to the tool and blank an additional movement as of a gear rolling on the mate gear while maintaining the axis of the blank so offset from the axis of the imaginary mate gear that in a plane tangent to the pitch surfaces of both gears they mesh substantially along the axis of one gear projected into said plane.

3. The method of producing a pair of gears having axes non-intersecting and non-parallel which includes proportioning the pitch surfaces of the two gears so that in development in a plane tangent to the pitch surfaces of both at a common contact point, a line passing through the apex of the gear and drawn from the intersection point of a normal to a tooth of the gear with a line perpendicular to said normal drawn from the intersection point of a perpendicular to the projected pinion axis at the common contact point between the two pitch surfaces, with a line drawn from the apex of the gear passing through the center of the longitudinal tooth profile of the gear, intersects the pinion axis at its apex.

4. The method of producing gears having axes non-intersecting and non-parallel and adapted to contact along the entire length of the tooth surfaces of one of the gears which includes proportioning their cone angles according to the following equation:

$$\sin^2 a'' = \sqrt{\frac{C_1^2}{4} + C_2} - \frac{C_1}{2}$$

where $$C_1 = \cotan^2 b \left[\left(\frac{N''}{N_1}\right)^2 A^2 + 1\right]$$

and $$C_2 = \cotan^2 b \left[\left(\frac{N''}{N_1}\right)^2 A^2\right]$$

and where $b$ is the angle between the axes of the two gears projected into a plane tangent to their respective pitch surfaces, $N'$ and $N''$ are their respective tooth numbers and $A$ the inverse ratio of said tooth numbers in development in said plane.

5. The method of producing gear teeth which consists in moving a tool in a straight line across the face of a gear blank while rotating the blank on its axis and imparting an additional relative movement between tool and blank about an axis offset from the blank axis and intersecting said straight line.

6. The method of producing a pair of hypoid gears which consists in producing the tooth surfaces of one gear by moving a tool in a straight radial line across the face of a stationary gear blank and producing the tooth surfaces of the other member by moving a tool in a straight line across the face of the gear blank while imparting a relative rolling motion between the tool and blank in the manner of a gear rolling on the first gear with its axis non-intersecting and non-parallel to the axis of the first gear.

7. The method of producing a pair of hypoid gears which consists in producing the tooth surfaces of one gear by moving a tool in a straight radial line across the face of a stationary gear blank and producing the tooth surfaces of the other member by moving a tool in a straight line across the face of a gear blank while imparting a relative rolling motion between the tool and blank in the manner of a gear rolling on the first gear with its axis non-intersecting and non-parallel to the axis of the first gear and proportioning said gears so that they will mesh along the projection of the axis of one gear into a plane tangent to the pitch surfaces of both at a mean contact point.

8. The method of producing a pair of hypoid gears which consists in producing the tooth surfaces of one gear by moving a tool in a straight radial line across the face of a stationary gear blank and producing the tooth surfaces of the other member by moving a tool in a straight line across the face of a gear blank while imparting a relative rolling motion between the tool and blank in the manner of a gear rolling on the first gear with its axis non-intersecting and non-parallel to the axis of the first gear and proportioning said gears so that they contact along the entire length of the tooth surface of one gear.

9. The method of producing a pair of hypoid gears which consists in producing the tooth surfaces of one gear by moving a tool in a straight radial line across the face of a stationary gear blank and producing the tooth surfaces of the other member by moving a tool in a straight line across the face of a gear blank while imparting a relative rolling motion between the tool and blank in the manner of a gear rolling on the first gear with its axis non-intersecting and non-parallel to the axis of the first gear and proportioning said gears so that the tooth spaces of one are substantially as wide along the whole tooth space as the teeth of the mating gear are thick.

10. The method of producing a pair of hypoid gears which consists in producing the tooth surfaces of one gear by moving a tool in a straight path across the face of a gear blank while rotating the blank on its axis and imparting an additional relative movement between tool and blank about an axis offset from the blank axis, providing the mate gear with conjugate tooth surfaces and proportioning the two gears so that they will mesh along the projection of the axis of one of the gears into a plane tangent to the pitch surfaces of both at a mean contact point.

11. The method of producing a pair of hypoid gears which consists in producing the tooth surfaces of one gear by moving a tool in a straight path across the face of a gear blank while rotating the blank on its axis and imparting an additional relative movement between tool and blank about an axis offset from the blank axis, providing the mate gear with conjugate tooth surfaces and proportioning the two gears so that the tooth spaces of one are substantially as wide along the whole tooth space as the teeth of the mating gear are thick.

12. The method of producing a pair of hypoid gears which consists in producing the tooth surfaces of one gear by moving a tool in a straight path across the face of a gear blank while rotating the blank on its axis and imparting an additional relative movement between tool and blank about an axis offset from the blank axis, providing the mate gear with conjugate tooth surfaces and proportioning the two gears so that they contact along the entire length of the tooth surface of one gear.

13. The method of producing a pair of hypoid gears which consists in producing the tooth surfaces of one gear by moving a tool in a straight line across the face of a gear blank while rotating the blank on its axis and imparting an additional relative movement between tool and blank about an axis offset from the blank axis and intersecting said straight line, providing the mate gear with conjugate tooth surfaces and proportioning the two gears so that they will mesh along the projection of the axis of one gear into a plane tangent to the pitch surfaces of both at a common contact point.

14. The method of producing a pair of hypoid gears which consists in producing the tooth surfaces of one gear by moving a tool in a straight line across the face of a gear blank while rotating the blank on its axis and imparting an additional relative movement between tool and blank about an axis offset from the blank axis, and intersecting said straight line, providing the mate gear with conjugate tooth surfaces and proportioning the two gears so that the tooth spaces of one are substantially as wide along the whole tooth space as the teeth of the mating gear are thick.

15. The method of producing a pair of hypoid gears which consists in producing the tooth surfaces of one gear by moving a tool in a straight line across the face of a gear blank while rotating the blank on its axis and imparting an additional relative movement between tool and blank about an axis offset from the blank axis, and intersecting said straight line, providing the mate gear with conjugate tooth surfaces and proportioning the two gears so that they contact along the entire length of the tooth surface of one gear.

16. The method of producing a pair of hypoid gears which consists in producing the tooth surfaces of one of the gears by moving a tool in a straight path across the face of a gear blank so that the cutting edge of the tool is always in line contact with the finished tooth surface, producing the other gear by moving a tool, representing a tooth surface of the first gear, across the face of a gear blank while imparting a relative rolling motion between tool and blank in the manner of a gear meshing with its axis non-intersecting and non-parallel to the gear first produced, and proportioning said gears so that they will mesh substantially along the projection of the axis of one of the gears into a plane tangent to the pitch surfaces of both a mean contact point.

17. The method of producing a pair of hypoid gears which consists in producing the tooth surfaces of one of the gears by moving a tool in a straight path across the face of a gear blank so that the cutting edge of the tool is always in line contact with the finished tooth surface, producing the other gear by moving a tool, representing a tooth surface of the first gear, across the face of a gear blank while imparting a relative rolling motion between tool and blank in the manner of a gear meshing with its axis non-intersecting and non-parallel to the axis of the gear first produced, and proportioning said gears so that the tooth spaces of one of said gears are substantially as wide along the whole tooth space as the teeth of the mating gear are thick.

ERNEST WILDHABER.